United States Patent Office 3,817,738
Patented June 18, 1974

3,817,738
REMOVAL OF ODORS FROM IMPURE
SULFURIC ACID
Ernest H. Sprague, Augusta, Ga., assignor to
Olin Corporation
No Drawing. Filed Dec. 29, 1972, Ser. No. 319,578
Int. Cl. B01d 53/14; C05b 11/08
U.S. Cl. 71—40                                    14 Claims

ABSTRACT OF THE DISCLOSURE

A method for producing odorless sulfuric acid from an aqueous solution of impure sulfuric acid containing odor causing components by the addition of a hydrazine compound. The impure sulfuric acid may be obtained from the drying towers of an electrolytic chlorine plant. The resulting odorless acid is useful in the production of phosphate fertilizers.

---

This invention relates to a novel method for purification of aqueous solutions of sulfuric acid. More particularly, it concerns an improved method for removing odor causing impurities from aqueous sulfuric acid solutions.

In the electrolytic production of chlorine, using either a mercury amalgam cell or a diaphragm cell, chlorine gas is produced which contains impurities such as water, hydrogen, air carbon dioxide, brine, mist and various organic impurities. Generally this chlorine cell gas is purified by a number of techniques prior to compression to liquid form. For example, some of the water vapor and brine mist are removed by cooling the chlorine cell gas in a water scrubber. The cooled gas is then dried by contacting it with concentrated sulfuric acid in countercurrent flow in at least one tower or tower section. Generally, the concentrated sulfuric acid has a concentration of from about 90 to about 100 percent $H_2SO_4$ by weight, which is fed to the last tower or section of towers in the series in countercurrent flow with gaseous chlorine recovered from the cell gas cooler. Spent sulfuric acid containing water and other impurities extracted from the gaseous chlorine, is removed from the first tower or tower section in the series, while the purified chlorine gas is removed from the last tower or tower section in the series.

The purified chlorine gas is then used as such or may be compressed to liquid form or otherwise processed prior to storage or use, as desired.

Generally, in the drying step, from about 25 to about 35 pounds of concentrated sulfuric acid is required to dry and purify one ton of chlorine gas. In a plant having a chlorine production capacity of about 200 tons per day, about 900 tons per year of spent sulfuric acid are produced. This spent acid, which is an impure aqueous sulfuric acid solution having an $H_2SO_4$ concentration of about 60 percent by weight contains, in addition to water, a number of other impurities originally present in the chlorine gas from the cell. In addition to removing water and chlorine from the chlorine gas, other impurities extracted by the sulfuric acid include aliphatic hydrocarbons having from 6 to 8 carbon atoms, hexachloroethane, chloromethane, chloranil, hexachlorobenzene, pentachlorophenol, carbonyl compounds such as ketones and/or aldehydes, and highly chlorinated polyaromatic compounds.

Although the exact chemical reactions which occur in the electrolytic cell to form the organic impurities in the chlorine cell gas is not precisely known, it is believed that the chlorine gas and hydrogen react with carbon in the graphite anodes and organic material in the brine solution to form the hydrocarbons and chlorinated hydrocarbon impurities. Some of these organic impurities impart an undesirable odor to the spent sulfuric acid which seriously limits its commercial use and sales. For example, when this spent sulfuric acid is used to react with phosphate rock to form a fertilizer material such as superphosphate, the gaseous reaction products emitted from the material not only have an undesirable odor, but also cause irritation of the eyes and skin of plant operators. Since the spent acid can not be readily sold, it must be disposed of, generally by neutralization with caustic or lime and then discarded as waste. Thus in addition to the cost of the neutralizing agent and the cost of disposing of the neutralized spent acid, a pollution problem is created.

It is known to treat sulfuric acid having a concentration of about 99 percent with hydrazine sulfate to remove inorganic oxidizing compounds such as nitric acid or persulfuric acid, as disclosed in U.S. Pat. No. 3,012,854, issued Dec. 12, 1961 to F. J. Plesmid. However, the sulfuric acid processed in this patent does not contain chlorine and organic impurities capable of imparting obnoxious odors to the sulfuric acid.

There is need at the present time for a method of purifying aqueous sulfuric acid solutions containing odor causing components in order to eliminate disposal and pollution problems and to provide a useful raw material for the fertilizer industry.

It is a primary object of the present invention to provide a method of preparing acidic raw materials for use in the production of phosphate fertilizers.

It is another object of the invention to provide a method of removing odor causing impurities from aqueous solutions of sulfuric acid.

A further object of the invention is to provide an improved method of changing a waste product from chlorine plant drying operations into a salable product useful in the production of phosphate fertilizers.

These and other objects of the invention will be apparent from the following detailed description of the invention.

It has now been discovered that the foregoing objects are accomplished when an aqueous solution of impure sulfuric acid containing odor causing components is reacted with an odor removing proportion of a hydrazine compound selected from the group consisting of hydrazine and hydrazine hydrate.

More in detail, any aqueous solution of impure sulfuric acid containing odor causing components can be treated with a hydrazine compound in accordance with the method of this invention. In order to simplify the disclosure of the invention it will be described hereinafter in terms of a preferred embodiment in which the odor causing components are removed from an aqueous solution of impure sulfuric acid obtained by the concentrated sulfuric acid scrubbing of chlorine cell gas produced in the electrolysis of brine in either a mercury amalgam cell or a diaphragm cell.

Generally the aqueous solution of impure sulfuric acid obtained in the above-mentioned scrubbing operation has a sulfuric acid concentration of from about 50 to about 90, and preferably from about 60 to about 80 percent by weight of sulfuric acid.

The balance of the aqueous solution of impure sulfuric acid containing odor causing components is essentially water except for a minor proportion of impurities which generally ranges from about 25 to about 1000 and more frequently from about 30 to about 300 parts of impurities per million parts by weight of the aqueous solution of impure sulfuric acid. Impurities other than water in the aqueous solution of impure sulfuric acid produced by acid scrubbing cooled chlorine cell gas have been identified by chemical analyses and include the following:

(1) chlorine,
(2) hexachloroethane,
(3) aliphatic hydrocarbons containing from 6 to 8 carbon atoms,
(4) chloromethane,
(5) chloranil,
(6) hexachlorobenzene,
(7) pentachlorophenol,
(8) carbonyl compounds such as ketones and/or aldehydes, and
(9) highly chlorinated polyaromatic compounds.

The ratio of chlorine to all the other impurities, other than water, in the aqueous solution of impure sulfuric acid is generally from about 9:1 to about 99:1 and more frequently from about 85:1 to about 98:1.

Although the identity of the odor causing compounds in the above group of impurities is not precisely known, it is believed that the odor causing organic impurities include the following:

(1) hexachloroethane,
(2) aliphatic hydrocarbons having from 6 to 8 carbon atoms such as hexane and octane,
(3) chloromethane, and
(4) carbonyl compounds such as ketones and aldehydes.

Generally these odor causing organic impurities comprise at least about one half of all the organic impurities in the aqueous solution of impure sulfuric acid produced in the scrubbers, but they may be present in smaller ratios occasionally.

Odor casing components are removed from the aqueous solution of impure sulfuric acid by the addition thereto of an odor removing proportion of a hydrazine compound selected from the group consisting of hydrazine and hydrazine hydrate. Generally a proportion of hydrazine compound of from about 20 to about 800, and preferably from about 25 to about 250 parts of hydrazine compound per million parts by weight of aqueous solution of impure sulfuric acid is satisfactory to remove the odor causing components from the impure sulfuric acid.

It will be understood that the exact proportion of hydrazine compound added to the aqueous solution of impure sulfuric acid will depend on the amount of odor causing components present. The proportion of hydrazine compound added should be sufficient to remove odor causing components but insufficient to react extensively with the sulfuric acid such that hydrazine reaction products are formed with the sulfuric acid.

The method of this invention for removing odor causing components from aqueous solutions of impure sulfuric acid comprises admixing the hydrazine compound with the aqueous solution of impure sulfuric acid, generally under ambient temperatures and atmospheric pressures.

The hydrazine compound may be added in the liquid, or gaseous form but it is preferable to add the hydrazine compound in liquid form. Aqueous solutions of hydrazine compound in any convenient strength may be used. Generally, aqueous solutions containing from about 5 to about 65 percent and preferably from about 20 to about 50 percent of hydrazine compound by weight are employed. The hydrazine solution is normally added at room temperature, although any convenient temperature may be used.

Although the invention has been described using hydrazine and hydrazine hydrate as the hydrazine compound, it will be recognized by those skilled in the art that similar proportions of other inorganic and organic hydrazine compounds can be employed to replace part or all of the hydrazine or hydrazine hydrate. Typical examples of suitable hydrazine compounds include hydrazine phosphates, hydrazine hydrochlorides and hydrazine hydrobromides. Examples of suitable organic hydrazine compound include lower mono- and dialkyl hydrazines such as methyl hydrazine, ethyl hydrazine, propyl hydrazine, butyl hydrazine, 1,1-dimethyl hydrazine, 1,1- and 1,2-diethyl hydrazine and 1,1-dibutyl hydrazine and salts thereof.

Admixing of the hydrazine compound with the aqueous solution of impure sulfuric acid is continued for a sufficient length of time to permit substantially complete reaction of the hydrazine compound with the odor causing components present in the impure sulfuric acid. Generally, with extensive agitation, this reaction is virtually instantaneous, but extended periods of agitation of the reaction mixture, for example, from about 5 to about 30 minutes, may be necessary when relatively large volumes of the aqueous solution of impure sulfuric acid are being treated and/or relatively mild agitation conditions are being employed. However, shorter or longer reaction times may be employed if desired. The degree of agitation should be sufficient to cause substantially complete distribution of the hydrazine compound throughout the entire volume of aqueous solution of impure sulfuric acid. The reaction temperature is generally ambient temperatures, for example, from about 40 to about 100° F., but higher or lower temperatures may be employed if desired. The reaction is generally carried out at atmospheric pressure, but slightly higher or lower pressures may be employed if desired.

Analysis of the thus treated aqueous solution of impure sulfuric acid shows that virtually all of the following impurities have been removed:

(1) chlorine,
(2) hexachloroethane,
(3) aliphatic hydrocarbons from 6 to 8 carbon atoms such as hexane and octane,
(4) chloromethane, and
(5) carbonyl compounds such as ketones and aldehydes.

Analysis of the thus treated sulfuric acid also shows that the following impurities, which appear to be odorless, are retained in the sulfuric acid:

(1) aromatic hydrocarbons such as chloranil,
(2) hexachlorobenzene,
(3) pentachlorophenol, and
(4) chlorinated polyaromatic compounds.

In another embodiment of the invention an inert gas such as air, nitrogen or carbon dioxide is blown through the aqueous solution of impure sulfuric acid to reduce the amount of excess chlorine prior to or simultaneously with the addition of the hydrazine compound. The inert gas is introduced at ambient temperatures. It may be advantageous to continue blowing inert gas through the sulfuric acid solution during treatment with the hydrazine compound to remove hydrochloric acid formed by the reaction of the hydrazine compound with chlorine.

The odorless sulfuric acid solutions produced by the method of the present invention may be used without further treatment in the production of phosphate fertilizers by the reaction with phosphate rock. For example, the production of superphosphate fertilizers is obtained by the reaction:

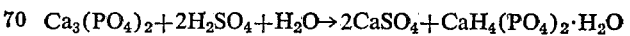

$$Ca_3(PO_4)_2 + 2H_2SO_4 + H_2O \rightarrow 2CaSO_4 + CaH_4(PO_4)_2 \cdot H_2O$$

Superphosphate fertilizers prepared by this process, using the purified odorless sulfuric acid solution prepared by the method of the present invention, may be stored for extended periods for aging and the like without emitting gases having undesirable odor and which cause irritation of the eyes and skin of plant operators.

The following examples are presented to illustrate the invention more fully. All parts and percentages are by weight unless otherwise indicated.

EXAMPLE 1

To a 15,000 gallon tank was added 7,000 gallons of an aqueous solution of about 70 percent sulfuric acid obtained from the drying towers of an electrolytic chlorine plant having an obnoxious odor and containing about 150 parts per million of impurities including chlorine, hexachloroethane, a mixture of $C_6$–$C_8$ aliphatic hydrocarbon groups, chloromethane, chlorinated aromatics such as chloranil, hexachlorobenzene, pentachlorophenol and other highly chlorinated polyaromatics, and compounds containing carbonyl groups. The solution was aerated to reduce the amount of chlorine present. While continuing to aerate and vigorously agitate the solution, 4.14 pounds of an aqueous solution containing 35 percent by weight of hydrazine was added. This corresponded to about 70 parts of hydrazine per million parts of impure sulfuric acid solution. The resulting product was an odorless aqueous solution of about 70 percent sulfuric acid. Infrared and mass spectrophotometry analysis of the purified odorless sulfuric acid showed that it was substantially free of chlorine, hexachloroethane, aliphatic hydrocarbons having from 6 to 8 carbon atoms such as hexane and octane, chlorinated alkanes such as chloromethane and carbonyl compounds such as ketones and aldehydes.

EXAMPLE 2

To an acidulation tower was added 1188 parts of phosphate rock containing 34.3 percent $P_2O_5$ and ground so that a minimum of 90 percent passes through a 100-mesh screen. Admixed with the rock was 1051 parts of about 70 percent sulfuric acid prepared as in Example 1, at a temperature of about 135° F. The reaction was continued for a period of about 7 hours at a temperature of about 230° F. During the reatcion, no obnoxious vapors are formed. A yield of 2000 parts of superphosphate containing 20 percent $P_2O_5$ was obtained, which was cured without emission of fumes which irritated the eyes and skin of plant operators.

For purposes of comparison, an impure aqueous solution of impure sulfuric acid of Example 1 prior to treatment with hydrazine was aerated until all of the chlorine present had been removed. When the chlorine-free sulfuric acid was used in the reaction with phosphate rock as in Example 2, obnoxious vapors were formed which were objectionable to operating personnel and fumes were emitted during reaction and curing which irritated the eyes and skin of plant operators. Thus it was shown by this comparative test that simple removal of the chlorine by aeration was insufficient to remove the odor forming organic impurities in the impure sulfuric acid. This example further shows that treatment of the aqueous solution of impure sulfuric acid with the hydrazine compound in accordance with the process of this invention was necessary in order to remove the odor causing impurities from the aqueous solution of impure sulfuric acid.

What is claimed is:

1. A method for producing odorless sulfuric acid from an aqueous solution of impure sulfuric acid containing ordor causing components which comprises admixing said aqueous solution with an odor removing proportion of a hydrazine compound selected from the group consisting of hydrazine and hydrazine hydrate.

2. The method of claim 1 wherein said impure sulfuric acid contains from about 50 to about 90 percent by weight of sulfuric acid.

3. The method of claim 2 wherein said odor removing proportion of hydrazine compound is from about 20 to about 800 parts per million parts of said impure sulfuric acid.

4. The method of claim 3 wherein said odor removing proportion of hydrazine compound is from about 25 to about 250 parts per million parts of said impure sulfuric acid, and said impure sulfuric acid contains from about 60 and about 80 percent by weight of sulfuric acid.

5. The method of claim 4 wherein said hydrazine compound is hydrazine.

6. The method of claim 4 wherein said hydrazine compound is admixed as an aqueous solution of hydrazine containing from about 5 to about 65 percent by weight of hydrazine.

7. The method of claim 4 wherein said hydrazine compound is admixed as an aqueous solution of hydrazine containing from about 20 to about 50 percent by weight of hydrazine.

8. The method of claim 7 wherein said impure sulfuric acid and said hydrazine compound are admixed by aeration.

9. The method of claim 4 wherein said odorless sulfuric acid is reacted with phosphate rock is a proportion sufficient to form superphosphates.

10. The method of claim 7 wherein said odor-causing components are selected from the group consisting of
(1) hexachloroethane,
(2) chloromethane,
(3) aliphatic hydrocarbons having from 6 to 8 carbon atoms, and
(4) carbonyl compounds.

11. The method of claim 10 wherein said impure sulfuric acid contains impurities ranging from about 25 to about 1000 parts per million of said impure sulfuric acid and said impurities include:
(1) said odor causing components of claim 10,
(2) chlorine,
(3) chloranil,
(4) hexachlorobenzene,
(5) pentachlorophenol, and
(6) chlorinated polyaromatic compounds.

12. The method of claim 11 wherein the proportion of said impurities ranges from about 30 to about 300 parts per million parts of impure sulfuric acid.

13. The method of claim 12 wherein said hydrazine compound is hydrazine.

14. The method of claim 13 wherein said odorless sulfuric acid is reacted with phosphate rock in a sufficient proportion to form superphosphate.

References Cited
UNITED STATES PATENTS

| | | | |
|---|---|---|---|
| 3,012,854 | 12/1961 | Plesmid | 423—523 |
| 3,022,155 | 2/1962 | Syeds | 71—40 |
| 3,308,606 | 3/1967 | Hagbarth | 55—71 |

CHARLES N. HART, Primary Examiner

U.S. Cl. X.R.
55—71; 423—531